US005803786A

United States Patent [19]

McCormick

[11] Patent Number: 5,803,786

[45] Date of Patent: Sep. 8, 1998

[54] CONTINUOUS PLAY MUSICAL MOBILE

[76] Inventor: Kathy McCormick, 306 SW. Persels Rd., Lee's Summit, Mo. 64081

[21] Appl. No.: 722,971

[22] Filed: Sep. 30, 1996

[51] Int. Cl.[6] .......................... A63H 33/00; G09F 19/08; A01K 29/00

[52] U.S. Cl. .......................... 446/227; 446/236; 40/414; 40/614; 119/708

[58] Field of Search .................................. 446/413, 414, 446/430, 613, 614, 617; 119/708, 707, 780; 248/104, 317, 610

[56] References Cited

U.S. PATENT DOCUMENTS

| | | | |
|---|---|---|---|
| 3,564,759 | 2/1971 | Buttermore | 446/227 |
| 3,919,795 | 11/1975 | Van Horne et al. | 40/33 |
| 3,927,482 | 12/1975 | Marcus | 40/33 |
| 4,430,818 | 2/1984 | Marcus | 40/614 X |
| 4,640,034 | 2/1987 | Zisholtz | 40/33 |
| 4,904,220 | 2/1990 | Williams et al. | 446/227 |
| 4,930,448 | 6/1990 | Robinson | 119/708 |
| 4,973,286 | 11/1990 | Davison . | |

*Primary Examiner*—Robert A. Hafer
*Assistant Examiner*—Laura Fossum
*Attorney, Agent, or Firm*—Patent & Trademark Services Inc.; Joseph H. McGlynn; Thomas Zack

[57] ABSTRACT

A mobile for a baby's crib or playpen that is operated by a motor. The mobile is mounted to the crib or playpen by means of a resilient shaft that will move under the influence of vibrations from the motor, thereby imparting another type of motion to the mobile. In addition a tape recorder or sound chip is incorporated into the device so parents can play soothing music to the infant. The recorder or sound chip is voice activated and has a mode switch which allows a parent to operate the mobile upon hearing noise, to turn the mobile on manually, or to turn the mobile off.

7 Claims, 1 Drawing Sheet

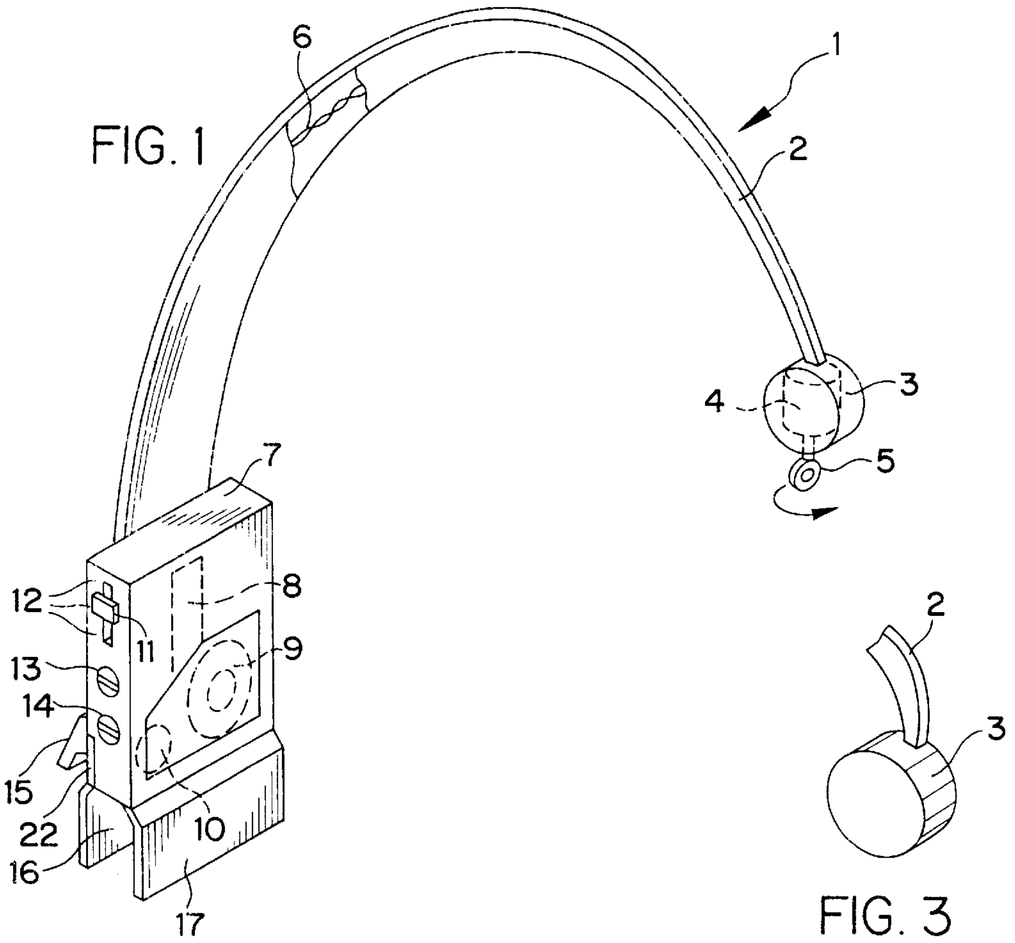
FIG. 1
FIG. 3
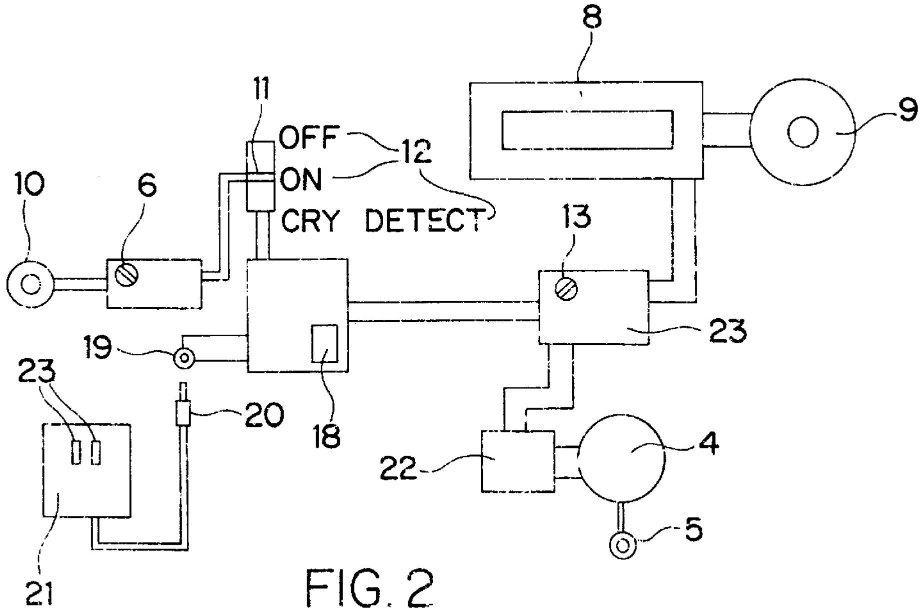
FIG. 2

CONTINUOUS PLAY MUSICAL MOBILE

BACKGROUND OF THE INVENTION

This invention relates, in general, to a motorized mobile, and, in particular, to a motorized mobile having a tape recorder incorporated therein.

DESCRIPTION OF THE PRIOR ART

In the prior art various types of mobile for cribs and playpens have been proposed. For example, U.S. Pat. No. 3,919,795 discloses a mobile with a motor having a cam shaft which causes the mobile to rotate about two axes.

U.S. Pat. No. 3,927,482 discloses a mobile with a flexible shaft that has a light that illuminates the mobile.

U.S. Pat. No. 4,640,034 discloses a mobile with a tape recorder that is voice actuated.

U.S. Pat. No. 4,973,286 discloses a mobile with a plurality of activated cartoon figures that move in time to the music.

SUMMARY OF THE INVENTION

The present invention is directed to a mobile for a baby's crib or playpen that is operated by a motor. The mobile is mounted to the crib or playpen by means of a resilient shaft that will move under the influence of vibrations from the motor, thereby imparting another type of motion to the mobile. In addition a tape recorder or sound chip is incorporated into the device so parents can play soothing music to the infant. The recorder or sound chip is voice activated and has a mode switch which allows a parent to operate the mobile upon hearing noise, to turn the mobile on manually, or to turn the mobile off.

It is an object of the present invention to provide a new and improved musical mobile.

It is an object of the present invention to provide a new and improved musical mobile with a tape recorder that is sound activated.

It is an object of the present invention to provide a new and improved musical mobile which is attached to a flexible support that imparts motion to the mobile.

These and other objects and advantages of the present invention will be fully apparent from the following description, when taken in connection with the annexed drawings.

BRIEF DESCRIPTION OF THE DRAWINGS

FIG. 1 is a perspective view of the present invention.

FIG. 2 is a schematic view of the electronics used with the present invention.

FIG. 3 is a partial view of the offset mount for the motor housing of the present invention.

DESCRIPTION OF THE PREFERRED EMBODIMENT

Referring now to the drawings in greater detail, FIG. 1 shows a perspective view of the present invention 1. The mobile is mounted to a crib or playpen (not shown) by a clamp which has two arms 16, 17 which slide over a rail and are held secured by a screw 15 which is threaded through the arm 16 and will tighten against a crib rail, for example. The clamp arms are connected to a housing 7 which contains the sound speaker 9, through which music can be played, the microphone 10 which will detect noise made by the infant (and will be explained in detail below), a speech chip 8 which will play recorded music, and a compartment 22 which will contain rechargeable batteries 18 (see FIG. 2).

It should be understood that these components are conventional and, therefore, no additional description will be given. Also, even though a sound chip is specified as the source of music, other sources, such as, but not limited, to tape players may be used to produce music or other soothing sounds.

On the side of the housing 7 is a three position slide switch 11 which will dictate which mode the mobile is in. The switch can be moved to three different positions 12. In one position the mobile will be turned off, in a second position the mobile will be on continuously, and in a third position the mobile will react to sounds made by the infant, and will automatically turn itself on.

In addition there are two other controls on the side of the housing. A microphone sensitivity control 14 will allow a parent to adjust the microphone so it will pick up sounds of a specific decibel level. In this way a parent can adjust the microphone so it will not activate the mobile if the infant makes some sounds without waking up. The level can be adjusted by the parent so that only when the baby wakes up and cries will the mobile turn on and play music or some other soothing sound to lull the baby back to sleep.

The second control is a timer 13, which is preferably electronic (but could also be a mechanical timer). By setting this control the parent can turn the mobile on for a specified period of time when the infant is put to bed at night. The timer will allow the mobile to play until the time limit set is reached, and then will turn the mobile off. Again, the timer and sound sensitivity switch are conventional items and, therefore no detailed description will be given.

Attached near the top of the housing is a support arm 2. The arm can be made unitary with the housing 7, or it can be made as a separate piece which will be attached to the housing by any conventional means. The arm should be made from a springy plastic material so that the weight of the motor 4 within the motor housing 3 and the rotary motion imparted to the connector 5 will cause the springy material of the arm to move in an up and down motion to whatever is attached to the connector 5. In order to enhance this motion, the motor housing 3 can be mounted on the arm 2 so the arm is offset from the center of the housing as shown in FIG. 3. This will increase the up and down motion imparted to the springy arm by the motor.

The motor housing 3 could be made unitary with the arm 2 such as by molding the motor 4 within the housing 3. In the alternative, the motor housing 3 could be a two part housing that could come apart so the motor could be replaced if necessary.

Also, shown in FIG. 1, the electrical wires 6 necessary to connect the batteries 18 and the motor 4 can be molded within the arm 2.

FIG. 2 shows a schematic of the electronics used with the present invention. The connector 5, to which various types of toys can be attached, is connected to a motor 4 which can be mounted to a motor driver printed circuit board 22. The timer 23 with its adjustment control 13 can be electrically connected to the board 22. In addition the sound chip 8 (or tape player) and the speaker 9 can be electrically connected to the motor through the board.

In addition, the three position switch 11 which controls which mode (on-off-cry detect) the mobile is in will be connected to the rechargeable batteries 18, as will the microphone 10 and the sensitivity adjustment 6. Also, the device may be provided with a conventional battery charger 21 which can be plugged into a conventional AC socket by means of electrical contacts 23, and which has a connector 20 which will connect the charger to the batteries 18.

In order to use the mobile, a parent would attach the mobile to a crib or playpen by placing the arms 16, 17 on the crib or playpen and tightening the screw 15. The user would then move the mode switch 11 into one of the three positions 12 to turn the mobile off, on or to cry detect mode. In the on position, the batteries would supply power through the wires 6 to the motor 4 which would rotate the mechanical connector 5 (and anything connected to the connector) in a rotary motion. At the same time, the sound chip 8 would play music or some other soothing sounds. The rotary motion of the motor would cause the springy arm 2 to move in an up and down motion, which would provide additional movement to whatever toy is connected to the connector 5 which, in turn would amuse the infant and help the infant to fall asleep.

If the switch 11 is in the cry detect position, the mobile would not turn on until the microphone 10 picks ups noises coming from the infant. At this time the mobile would turn on the motor 4 and the device would operate as described above.

In addition the user could turn on the timer by means of the adjustment control 13 on the side of the housing 7 when the switch 11 is in the on position, and the timer would allow the motor to run for a preselected time and then turn off the motor. In this manner, the parent could select which ever mode is best to help lull the infant to sleep.

The primary components of the mobile would be best manufactured from ABS plastic, (although other materials could be used) using an injection molding process. Injection molding is a plastic molding procedure whereby heat softened plastic material is forced under very high pressure into a metal cavity mold which is relatively cool. Acceptable metals for the mold are aluminum and steel. The inside cavity of the mold is comprised of two or more halves, and is the same desired shape as the product to be formed. High pressure hydraulics are used to keep the mold components together during the actual injection phase of the molding process. The injected plastic is allowed to cool and harden. The hydraulics holding the multiple component cavity together are released, the halves of the mold are separated and the solid formed plastic item is removed. Injection molding can be a highly automated process and is capable of producing extremely detailed parts at a very cost effective price.

The DC motor, rechargeable batteries, low voltage charge/power pack and the sound generating chip are all available as "off the shelf" components (see the Thomas Register for sources).

The electronics of the mobile are manufactured using fiberglass printed circuit boards with "off the shelf" electronic items. Once the components are installed (either by hand or robots), they are mass soldered to the PCB boards using either the wave soldering process or the drag soldering process.

Although the Continuous Play Musical Mobile and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A mobile for use on a structure holding an infant, said mobile comprising:

a housing, said housing having detachable holding means for attachment to said structure, connector means for holding decorative elements, a motor means connected to said connector means for imparting rotary motion to said connector means, resilient means for connecting said motor means to said housing, wherein said resilient means for connecting said motor means to said housing is a curved arm which is attached adjacent a top of said housing at one end of said arm, another end of said curved arm is attached to said motor means, and wherein said motor means is contained within said housing, said curved arm is attached to said housing offset from a center of said housing, and wherein when rotary motion is imparted to said connector means by said motor means, said curved arm and said motor means are configured and arranged to impart an up and down motion to said curved arm and to said connector means, and whereby said offset attachment of said curved arm is configured and arranged to enhance the up and down motion of the curved arm.

2. The mobile for use on a structure holding an infant as claimed in claim 1, wherein said housing contains means for producing sounds when said motor means is activated.

3. The mobile for use on a structure holding an infant as claimed in claim 2, wherein said means for producing sounds is a music chip, and said housing contains means for supplying electrical power to said music chip and to said motor means, said housing also contains switch means for turning said means for supplying electrical power on and off.

4. The mobile for use on a structure holding an infant as claimed in claim 3, wherein said switch means is responsive to ambient sounds.

5. The mobile for use on a structure holding an infant as claimed in claim 4, wherein said switch means is electrically connected to a microphone which receives said ambient sounds.

6. The mobile for use on a structure holding an infant as claimed in claim 1, wherein said housing contains a timer means for turning said motor means on for a preselected period of time.

7. The mobile for use on a structure holding an infant as claimed in claim 5, wherein said housing contains means for adjusting the amount of sound which will activate said switch means.

* * * * *